United States Patent
Wohl, Jr. et al.

(10) Patent No.: US 9,957,336 B2
(45) Date of Patent: May 1, 2018

(54) METHOD OF MAKING DYE-DOPED POLYSTYRE MICROPARTICLES

(71) Applicant: The United States of America represented by the Administrator of the National Aeronautics and Space Administration, Washington, DC (US)

(72) Inventors: Christopher J. Wohl, Jr., Portsmouth, VA (US); Pacita I. Tiemsin, Newport News, VA (US); Paul M. Danehy, Newport News, VA (US); Jason E. Danley, Lincoln, NE (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 77 days.

(21) Appl. No.: 14/706,585

(22) Filed: May 7, 2015

(65) Prior Publication Data
US 2015/0322336 A1    Nov. 12, 2015

Related U.S. Application Data

(60) Provisional application No. 62/109,359, filed on Jan. 29, 2015, provisional application No. 61/990,294, filed on May 8, 2014.

(51) Int. Cl.
*C09D 11/50*    (2014.01)
*C08F 212/14*    (2006.01)
(Continued)

(52) U.S. Cl.
CPC ............ *C08F 12/30* (2013.01); *C09D 11/328* (2013.01); *C09D 11/50* (2013.01); *C09K 11/025* (2013.01);
(Continued)

(58) Field of Classification Search
CPC .. C09D 11/328; C09D 11/50; B42D 2033/14; B42D 2033/20; B42D 2035/34; B42D 2035/40; C08J 7/065; H01S 3/168
See application file for complete search history.

(56) References Cited

PUBLICATIONS

Borisov et al, Dye-Doped polymeric particles for sensing and Imaging, 2010.*

(Continued)

*Primary Examiner* — Holly Le
(74) *Attorney, Agent, or Firm* — Jennifer L. Riley; Robin W. Edwards; Mark P. Dvorscak (57) ABSTRACT

Various embodiments provide dye-doped polystyrene microspheres generated using dispersion polymerization. Polystyrene microspheres may be doped with fluorescent dyes, such as xanthene derivatives including kiton red 620 (KR620), using dispersion polymerization. Certain functionalities, such as sodium styrene sulfonate, may be used to shift the equilibrium distribution of dye molecules to favor incorporation of the dye into the particles. Polyelectrolyte materials, such as poly(diallyldimethyl ammonium chloride), PolyDADMAC, may be used to electrostatically trap and bind dye molecules within the particles. A buffer may be used to stabilize the pH change of the solution during dye-doped polystyrene microsphere generation and the buffer may be selected depending on the pKa of the dye being incorporated. The various embodiments may provide dye-doped polystyrene microspheres, such as KR620-doped polystyrene microspheres that are non-toxic and non-carcinogenic. These non-toxic and non-carcinogenic dye-doped polystyrene microspheres may be suitable for use in wind tunnel testing.

14 Claims, 2 Drawing Sheets

(51) Int. Cl.
  *C08F 12/30* (2006.01)
  *C09K 11/02* (2006.01)
  *C09K 11/06* (2006.01)
  *C09D 11/328* (2014.01)
  *G01P 5/20* (2006.01)
  *G01M 9/04* (2006.01)

(52) U.S. Cl.
  CPC ............... *C09K 11/06* (2013.01); *G01P 5/20* (2013.01); *C09K 2211/1007* (2013.01); *C09K 2211/1096* (2013.01); *G01M 9/04* (2013.01)

(56) References Cited

PUBLICATIONS

Turner et al, The Emulsion Copolymerization of STyrene and sodium styrene sulfonate, J. of Pol. Sci., vol. 23, 1985.*

* cited by examiner

METHOD OF MAKING DYE-DOPED POLYSTYRE MICROPARTICLES

CROSS-REFERENCE TO RELATED PATENT APPLICATION(S)

This patent application claims the benefit of and priority to U.S. Provisional Patent Application No. 61/990,294 entitled "Dye-Doped Polymer Microparticles" filed May 8, 2014 and U.S. Provisional Patent Application 62/109,359 entitled "Dye-Doped Polymer Microparticles" filed Jan. 29, 2015. This patent application is also related to U.S. Provisional Patent Application No. 61/820,972 entitled "Dye-Doped Polymer Microparticles" filed May 8, 2013. The entire contents of all three applications are each hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Microparticles are commonly used as a seed material in wind tunnel testing to measure the airflow velocity, biological testing, and histological staining, among other applications. Two common measurement techniques in wind tunnel testing include particle image velocimetry (PIV) and laser Doppler velocimetry (LDV). In both techniques, laser irradiation is scattered off incident particles seeded in the flow. In PIV, a camera is used to take pictures of an area of a flow field which is illuminated by a pulsed laser. The position of the seed particles in sequential images is used to determine velocities; enabling planar data analysis of turbulence levels, length scales, coherent flow structures, flow-induced forces and moments. In LDV, two laser beams cross and interfere to create a fringe pattern which is used to determine point-wise velocities from the frequency of light scattered by the particles.

Good seed materials for PIV and LDV must have a small aerodynamic diameter and a high index of refraction. Aerodynamic diameter is an indicator of how well a seed particle velocity matches that of the surrounding fluid. If the aerodynamic diameter is small, the particle velocity can be assumed to be equal to the velocity of the surrounding fluid. Traditional seed materials include smoke, olive oil, kerosene and diethylhexylsebacate (DEHS). Polystyrene latex microsphere particles (PSLs) have also been used extensively as seed materials for PIV and LDV measurements due to their low aerodynamic diameter and high refractive index, which results in higher intensity Mie scattering when they are illuminated with a laser light For PSLs to be used as seed material in laser-induced fluorescence (LIF) experiments, the integration of highly fluorescent dyes in the PSLs at concentrations great enough to enable detection in the airflow is critical. Several techniques have been utilized to incorporate dye materials in particles and can basically be split into two approaches, incorporation of the dye during particle synthesis and incorporation after particle synthesis. Incorporation of dye into existing particles can be achieved on just the surface through adsorption or into the particle matrix by particle swelling followed by solvent exchange. However, these methodologies do not yield particles with homogeneous distribution, macroscopically, of dye within the particle matrix and require multi-step processes leveraging expensive filtration devices to generate the dye incorporated particles. Additionally, the dyes used in current approaches, such as members of the rhodamine family (e.g., rhodamine 610), have been classified as potentially toxic and carcinogenic by the International Agency for Research on Cancer. Therefore, these dyes are not likely to be used for wind tunnel testing.

BRIEF SUMMARY OF THE INVENTION

Various embodiments provide dye-doped polystyrene microspheres generated using dispersion polymerization. In various embodiments, polystyrene microspheres may be doped with xanthene dyes, such as kiton red 620 (KR620), using dispersion polymerization. In the various embodiments, certain functionalities, such as sodium styrene sulfonate, may be used to shift the equilibrium distribution of dye molecules to favor incorporation of the dye into the particles. In the various embodiments, polyelectrolyte materials, such as poly(diallyldimethyl ammonium chloride), PolyDADMAC, may be used to electrostatically trap and bind dye molecules within the particles. In the various embodiments, a buffer may be used to stabilize the pH change of the solution during dye-doped polystyrene microsphere generation and the buffer may be selected depending on the pKa of the dye being incorporated. The various embodiments may provide dye-doped polystyrene microspheres, such as KR620-doped polystyrene microspheres that are non-toxic and non-carcinogenic. These non-toxic and non-carcinogenic dye-doped polystyrene microspheres may be suitable for use in wind tunnel testing. The dye-doped polystyrene microspheres of the various embodiments may be used to simultaneously measure the velocity, temperature, pressure, and mixing concentration of an airflow. Additionally, dye-doped polystyrene microspheres of the various embodiments may allow measurements to be made much closer to walls and surfaces than previously possible.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments provide dye-doped polystyrene microspheres (also referred to as polystyrene latex microsphere particles (PSLs)) generated using dispersion polymerization. The various embodiments provide particles that have a narrow size distribution, retain the dye in the particles (not leach out into the solution) and that fluoresce brightly when excited by a laser. In the various embodiments, the polystyrene microspheres may be generated via dispersion polymerization starting with styrene monomer in a reaction kettle with mechanical mixing, heating, and purging oxygen from the liquids using an inert gas, such as nitrogen gas. The reaction may be run overnight (e.g., for 21 hours) in an inert atmosphere, such as a nitrogen atmosphere. The radical polymerization may be initiated using any radical source (i.e., a radical initiator) such as those that form through: thermal decomposition, such as but not limited to potassium persulfate or azobisisobutyronitrile; UV irradiation, such as but not limited to peroxides; oxidation, such as but not limited to (2,2,6,6-Tetramethylpiperidin-1-yl)oxyl (TEMPO); or other methods. The size of the polystyrene microspheres may be controlled by reaction conditions, reactant concentrations, and the concentration of stabilizers that are present in the reaction mixture. Incorporation of the dye molecules may be completed prior to the introduction of the initiator. In the various embodiments fluorescent dyes, such as xanthene dyes, may be incorporated into the polystyrene microspheres. Certain dyes, such as kiton red 620, may not be by themselves readily incorporated into the polystyrene microspheres, and the various embodiments incorporate other materials specifically to improve the uptake of dye materials by the polystyrene microspheres during their synthesis. In this manner, the various embodiments may provide dye-doped polystyrene microspheres, such as KR620-doped polystyrene microspheres that are non-toxic and non-carcinogenic because non-toxic and non-carcinogenic dyes, such as KR620, may be incorporated into the polystyrene microspheres. These non-toxic and non-carcinogenic dye-doped polystyrene microspheres may be suitable for use in wind tunnel testing.

In the various embodiments, certain functionalities may be used to shift the equilibrium distribution of dye molecules to favor incorporation of the dye into the particles. When the charge of the dye molecules and the charge of the polymer matrix is the same, the polymer may electrostatically repulse the dye molecules causing leaching of the dye. Thus, in the various embodiments, functionalities may be used to change the charge of the molecules to attract rather than reply one another. In an embodiment, sodium styrene sulfonate may be used to incorporate dye molecules with a net positive charge. Other functionalized styrene monomers may be used to incorporate dye molecules with a net positive charge, as well as functionalized arcylate monomers (e.g., methacrylate monomers) or monomers of any material that can participate in radical polymerization reactions. Experimentation with incorporation of kiton red 620 (KR620) into PSLs without positively charging the PSL to bind dye molecules within the particles was not successful, potentially due to the anionic charge present in the KR620 molecule which may cause electrostatic repulsion by sulfate groups that populate the PSL surface.

In the various embodiments, polyelectrolyte materials may be used to electrostatically trap and bind dye molecules within the particles. For example, poly(diallyldimethyl ammonium chloride), PolyDADMAC (or polyD), may be used to electrostatically bind dye molecules of KR620 into the particles. The use of polyelectrolyte materials, such as PolyDADMAC, may inhibit leaching of dye, such as KR620, from the particles. The PolyDADMAC may form a shell around the PSL trapping the KR620 within the PSL. The shell may form an electrostatic double layer around the PSL particle preventing diffusion of the KR620 across the double layer. Alternatively, an anionic polyelectrolyte, such as poly(acrylic acid), may be used to electrostatically trap and bind a dye molecule. This anionic polyelectrolyte may be incorporated in conjunction with cationic-functionalized monomers to form an electrostatic double layer In the various embodiments, sodium bicarbonate may be used to stabilize the pH level of the solution which may have a strong effect on fluorescence intensity. During the course of the particle synthesis, the pH of the solution changes dramatically (in the absence of the buffer) resulting in an acidic environment. With the buffer (e.g., sodium bicarbonate) present, the pH may be stabilized through the course of the reaction resulting in better performance (i.e., higher fluorescence) of the dyes. Although sodium bicarbonate is discussed herein as an example buffer, in other embodiments any buffer system may be used to stabilize the pH change and the buffer may be selected depending on the pKa of the dye being incorporated. The pKa is the pH level that a protonation/deprotonation event will occur at for the chemical in question. For example, the pKa of dichlorofluorescein is 5.1 indicating that the dye will be protonated, and non-fluorescent, at pH levels below 5.1. Experimentation with KR602-doped PSL synthesis without a buffer indicated that the pH of the solution changed from approximately 7 to less than 3, which likely resulted in the formation of surface hydroxyl functionalities due to the hydrolysis of sulfate groups. Therefore, inclusion of a buffer, such as sodium bicarbonate, may maintain a stable pH throughout the polymerization reaction.

In an embodiment, a cross linking agent, such as divinylbenzene, may be used to cross link the PSL to make diffusion of the dye molecules out of the PSL matrix more difficult. The cross linking of the PSLs may increase the tortuosity of the diffusion path of the dye molecules out of the PSLs, thereby decreasing leakage. In the various embodiments, the amount of cross linking agent may be selected such that the cross linking agent represents 0-20 percent of the monomer content of the PSLs, such as 0-0.1 percent, 0-1.5 percent, 0.1-1.5 percent, 0.1-20 percent, etc.

Figure 1:
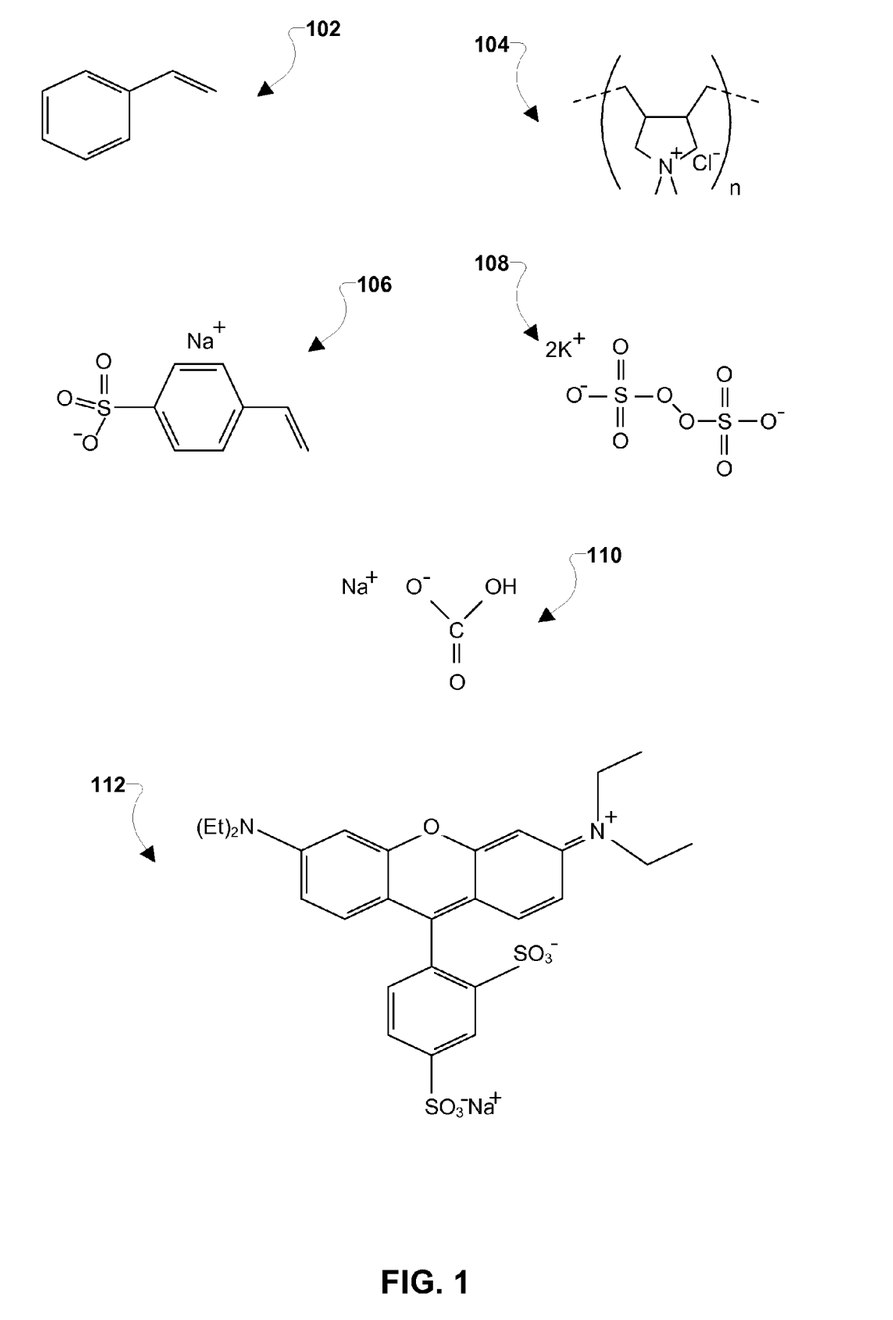
FIG. 1 illustrates materials suitable for use in the various embodiments for generating dye-doped polystyrene microspheres using dispersion polymerization.

FIG. 1 illustrates materials suitable for use in the various embodiments for generating dye-doped polystyrene microspheres using dispersion polymerization. In the various embodiments, a styrene monomer 102, polyD 104, styrene sulfonate 106, potassium persulfate 108, sodium bicarbonate 110, and KR620 112 may be combined in various amounts to generate a dye-doped PSL. As examples, starting with about 33 mL of styrene, a molar ratio of styrene sulfonate 106 to styrene monomer 102 may be from a low level of 0 to a high level of 0.2, such as a molar ratio of styrene sulfonate 106 to styrene monomer 102 from 0-0.2, 0-0.1, 0-0.05, 0-0.06, 0, 0.03, 0.06, 0.1, 0.2, etc. An amount of polyD 104 may be from a range of 0 to 3.0 grams, such as 0-2.0 grams, 0-1.0 grams, 0-0.5 grams, 0.5 grams, 1.0 grams, 1.5 grams, 2.0 grams, 3.0 grams, etc. An amount of sodium bicarbonate 110 may be from a range of 0 to 3.5 grams, such as 0-3.0 grams, 0-2.0 grams, 0-1.5 grams, 0-1.0 grams, 0-0.5 grams, 0.5 grams, 1.0 grams, 1.5 grams, 2.0 grams, 2.5 grams, 3.0 grams, etc. An amount of KR620 may be from 1 mg to 100 mg, such as 1 mg to 50 mg, 5 mg to 100 mg, 5 mg to 50 mg, 5 mg to 25 mg, 25 mg to 50 mg, 25 mg to 100 mg, 5 mg, 25 mg, 50 mg, 100 mg, etc. An amount of potassium persulfate 108 may be from a range of 0.05 grams to 1.0 grams, such as 0.05 grams to 0.2 grams, 0.2 grams to 1.0 grams, 0.05 to 0.5 grams, 0.05 grams, 0.2 grams, 0.5 grams, 1.0 grams, etc.

In the various embodiments, the polystyrene microspheres may be generated via dispersion polymerization with the selected amounts of the materials 102, 104, 106, 108, 110, and/or 112 in a reaction kettle with mechanical mixing, heating, and purging oxygen from the liquids using nitrogen gas for a period of time, such as 2 to 72 hours, 20 to 21 hours, 2 to 20 hours, 2 to 21 hours, 20 to 72 hours, 21 to 72 hours, 2 hours, 20 hours, 21 hours, 24 hours, 72 hours, greater than 72 hours, etc. in an inert, nitrogen, atmosphere.

Figures 2, 2A:
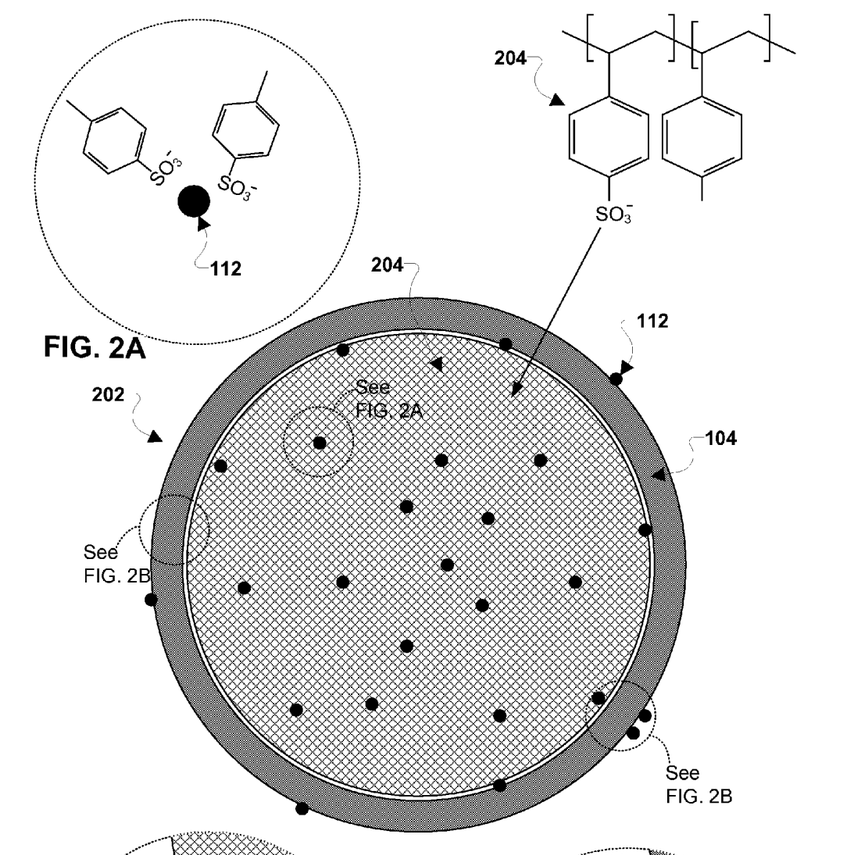
FIG. 2 illustrates an embodiment of dye-doped polystyrene microsphere.
FIGS. 2A, 2B, and 2C are enlarged views of portions of the dye-doped polystyrene microsphere illustrated in FIG. 2.
Figure 2B:
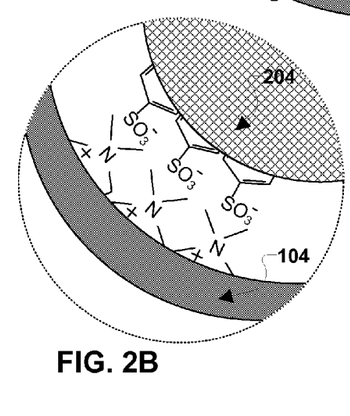
Figure 2C:
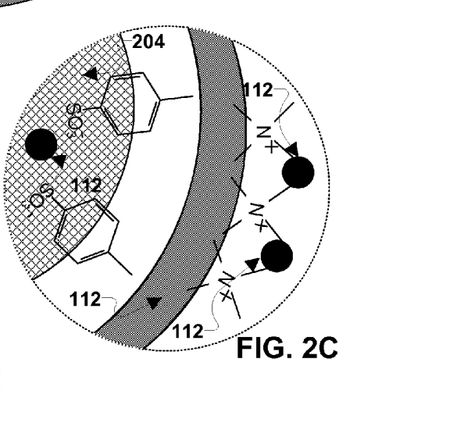

FIG. 2 illustrates an embodiment of dye-doped polystyrene microsphere, such as a KR620-doped PSL 202 that may be generated by dispersion polymerization of the materials 102, 104, 106, 108, 110, and/or 112. The KR620-doped PSL 202 may include a shell of polyD 104 surrounding the poly(styrene-co-styrene sulfonate) microsphere 204. As illustrated in the enlarged view shown in FIG. 2A, the KR620 112 may be encapsulated in the PSL 202. As illustrated in the enlarged view shown in FIG. 2B, the shell of polyD 104 may form an electrostatic double layer around the PSL 204. As illustrated in the enlarged view shown in FIG. 2C, the shell of polyD 104 forming an electrostatic double layer around the PSL 204 may prevent diffusion of the KR620 112 across the double layer.

Polystyrene Microsphere Synthesis and Characterization-Small Scale Experiments

A series of small scale experiments according to the various embodiments were conducted, with batch volumes of approximately 250 mL. To reduce variability, both initiator concentration and stir speed were held constant in the experiments as these experimental parameters have been demonstrated to impact PSL size and size distribution. With all of the experimental variables, such as different amounts of the materials 102, 104, 106, 108, 110, and/or 112 described above, a design of experiments (DOE) was utilized. The DOE method involved conducting a series of tests in which purposeful changes were made to input variables of the system. Then, the effects on output variables were measured. This method was designed to maximize the amount of information gained with a minimum number of experiments. This was done by varying factors simultaneously, instead of individually.

As discussed above, many variables, such as the relative amounts of the materials 102, 104, 106, 108, 110, and/or 112, may affect the results of the reaction. Therefore, DOE was utilized to investigate the effect of four factors: the mole ratio of styrene sulfonate, SS, to styrene (SS/S), and the amounts of KR620, polyD, and sodium bicarbonate buffer used in the reaction. The design used was a 4 factor, 2 level, full factorial design with 8 center points as illustrated in Table 1 below. A full factorial design involves running experiments for every combination of the factors at each level. In this case, 4 factors are varied between a "high" level and a "low" level, + and − signs in Table 1. This gave a total of 16 combinations for which experiments were run. Additionally, 8 center points were included, indicated as "M" in Table 1. Center points were tests for which each factor was held at the half-way point between the "high" and "low" levels. These center points were included to provide statistical power by estimating the repeatability of the experiments. The center points also provided a third point in addition to the "high" and "low" point, which allows one to move past a linear regression and estimate curvature. In order to synthesize the necessary number of batches for a 4 factor, 2 level full factorial experiment, two reactors were required. Therefore, the design included blocking the experiments for each reactor, which enabled elimination of unforeseen discrepancies in the results obtained from each reactor. Similarly, the order in which each experimental run was performed was randomized (see the Experiment #vs Run #columns in Table 1) to remove any systemic errors in the data collected and enable thorough evaluation of the contributions from each factor. After completing each experiment, several output variables were measured. These included measurements of the particle size and distribution, the relative fluorescent signal, and the amount of leaching that occurred.

TABLE 1

DOE Synthetic Outline For Each Factor

| Experiment # | Run # | Block | KR620 | SS/S Ratio | PolyD | NaHCO₃ |
|---|---|---|---|---|---|---|
| PSL-1 | 14 | 2 | − | − | − | − |
| PSL-2 | 1 | 1 | + | − | − | − |
| PSL-3 | 8 | 1 | − | + | − | − |
| PSL-4 | 23 | 2 | + | + | − | − |
| PSL-5 | 5 | 1 | − | − | + | − |
| PSL-6 | 20 | 2 | + | − | + | − |
| PSL-7 | 21 | 2 | − | + | + | − |
| PSL-8 | 4 | 1 | + | + | + | − |
| PSL-9 | 10 | 1 | − | − | − | + |
| PSL-10 | 18 | 2 | + | − | − | + |
| PSL-11 | 17 | 2 | − | + | − | + |
| PSL-12 | 12 | 1 | + | + | − | + |
| PSL-13 | 22 | 2 | − | − | + | + |
| PSL-14 | 2 | 1 | + | − | + | + |
| PSL-15 | 7 | 1 | − | + | + | + |
| PSL-16 | 16 | 2 | + | + | + | + |
| PSL-17 | 9 | 1 | M | M | M | M |
| PSL-18 | 3 | 1 | M | M | M | M |
| PSL-19 | 6 | 1 | M | M | M | M |
| PSL-20 | 11 | 1 | M | M | M | M |
| PSL-21 | 13 | 2 | M | M | M | M |
| PSL-22 | 24 | 2 | M | M | M | M |
| PSL-23 | 15 | 2 | M | M | M | M |
| PSL-24 | 19 | 2 | M | M | M | M |

The range for the low and high levels for each factor was determined prior to starting the experiments. Conservative ranges that would still result in changes to the experimental outcome were identified as illustrated in Table 2. For midpoint experiments, the values for each factor were simply the middle of the experimental range. All of the quantities were calculated for a target solution volume of 250 mL. The responses identified, where a response is the results from characterization of the PSLs, along with the target for each response are indicated in Table 3. The goal for particle size was selected based on a typical particle size for use in airflow seeding, while the goal for particle size distribution was based on an attempt to minimize the propagation of error in particle size to error in measured airflow properties. Maximizing the fluorescent emission would enable the greatest signal to noise ratio. The dye retention response is the percentage of KR620 retained within the PSLs after leaching experiments. Measuring the Rayleigh scattering of the filtrate solution from leaching experiments at 400 nm provides insight into the portion of soluble polymeric material, which is undesirable, generated during the PSL synthesis.

TABLE 2

Range of each factor evaluated

| Factor | Low Level | High Level |
|---|---|---|
| Kiton red 620, mg | 5 | 50 |
| SS/S molar ratio | 0 | 0.06 |
| PolyD, g | 0 | 1.0 |
| $NaHCO_3$, g | 0 | 1.5 |

TABLE 3

DOE response parameters and goals

| Response | Goal |
|---|---|
| Particle size | 1 μm |
| Particle size distribution | Standard deviation ≤25% |
| Fluorescent emission | Maximize |
| Dye retention (ret %) | Maximize |
| Leach solution absorbance at 400 nm | Minimize |

Styrene (from Sigma-Aldrich) was distilled prior to use to remove the inhibitor, 4-tert-butylcatechol. The remaining reagents were used as received. Particle size measurements were conducted on a Particle Sizing System Model 780 AccuSizer. The morphology of the particles was characterized using optical and scanning electron microscopy. Both optical absorption and fluorescent emission data were collected on the generated materials.

The synthesis of PSLs was done on a small scale, with batch volumes of approximately 250 mL used in each experimental run. A 500 mL reaction kettle was fitted with a mechanical stir rod, a water-cooled condensation column, and a nitrogen inlet. The reaction kettle lid was secured and sealed to the kettle by using a small amount of vacuum grease and a fitted clamp. The kettle was placed in an oil bath that also contained a thermocouple to track and control its temperature. As previously mentioned, two reaction set-ups, collocated to minimize environmental factor impact, were required to complete all of the synthetic trials outlined in the DOE matrix.

Although each synthetic trial was slightly different depending on what parameters were being evaluated, a general description is provided. Sodium bicarbonate (the amount depending upon the synthetic trial) was added to a beaker containing deionized water (250 mL, 18 MΩ). A portion of the buffer/water solution (approximately 50 mL) was placed in a beaker and sparged with nitrogen ($N_2$) at a high flow rate for approximately 30 minutes. At which point, 8 mL of the sparged buffer solution was placed in a small beaker, covered, and placed in an oven at 70° C. Concurrent to this, a portion of the buffer solution (approximately 50 mL) was added to the reaction kettle. KR620 (the amount depending upon the synthetic trial) was mixed into 100 mL of the buffer solution and added to the reaction kettle. PolyD (the amount depending upon the synthetic trial) was rinsed into the reaction kettle with 50 mL of the buffer solution. Styrene (freshly distilled) and styrene sulfonate (the quantity of both components depended upon the synthetic trial) were then added to the reaction kettle. The remaining sparged buffer solution was used to rinse any residues into the kettle. The mixture in the kettle was sparged with $N_2$ and stirred at 60 rpm for approximately 60 minutes. Once the sparging was complete, the $N_2$ gas flow rate was reduced, and the sparging tube was replaced with a $N_2$ source to maintain an inert atmosphere and the stir rate was increased to 250 rpm. The temperature of the hot plate was then set to 90° C.; based on empirical results, an oil bath temperature of approximately 90° C. resulted in a reaction solution temperature of 70° C. After thermal equilibration, approximately 0.2059 g $K_2S_2O_8$ was added to the 8 mL of heated, sparged solution and subsequently added to the reaction kettle. The mixture was stirred at 250 rpm at constant temperature under an inert atmosphere for approximately 21 hours. Next, the kettle was allowed to cool to ambient temperature and the solution was poured through a funnel using cheese cloth to capture any large agglomerates of polystyrene material.

Fluorescent emission of each batch of PSLs was collected by preparing a microscope slide through soaking in 2 N NaOH for approximately 10 min followed by applying a layer of particle solution to the slide and drying in an oven. The slide was placed below a low power, continuous wave Nd:YAG laser that passed through a concave lens to broaden the beam. Fluorescent emission was collected by a fiber optic after passing through a Semrock 532 nm notch filter. The fiber optic transferred the signal to an Ocean Optics spectrometer and the data was analyzed using SpectraSuite software. The collected spectra were processed by subtracting the background intensity and correcting for the relative spectral response of the detection system.

Several additional factors were involved in order to enable accurate comparison of the spectral data. The thickness of the sample may play a large role in signal strength. Therefore, approximately 200 mL of the PSL suspension was used for sample generation. The solution was manually spread using a glass pipette over approximately the same surface area of the prepared slide to minimize local variation in concentration. Still, the location of excitation on the sample can affect the measured signal strength with fluorescent intensity varying as much as 50% for different surface regions. Great care was taken to ascertain an average fluorescent emission intensity on the PSL-covered surface; however, the relative fluorescent emission intensity should be considered a largely qualitative measurement. The measurements were collected in this manner to best represent the particle state when present in a wind tunnel environment, where it is believed that the solvent will rapidly evaporate due to expansion resulting in dry particles.

A leaching study was conducted to determine if the KR620 was successfully incorporated into the PSLs or simply dissolved in the solution. To assess this, a PSL suspension (10 mL) was placed in a centrifuge tube and spun at 4500 rpm for 45 minutes (Contra CL3). The absorption spectrum of the centrifugate was collected on a PerkinElmer Lambda 900 UV Spectrometer. Two factors were determined from the collected spectrum, the dye concentration and the degree of light scattering. To determine the dye concentration, a Beer-Lambert plot of KR620 absorbance values ($\lambda_{max}$=564 nm) at known concentrations was generated to determine the molar extinction coefficient $\epsilon$=110 mM$^{-1}$cm$^{-1}$ (an ε of 118 mM$^{-1}$cm$^{-1}$ in ethanol is reported from Exciton). This was used to determine the KR620 concentration in the centrifugate. The collected spectra were corrected for Rayleigh scattering to determine the absorbance at $\lambda_{max}$ arising solely from KR620. Calculated concentrations were then compared to the KR620 concentration in the PSL batch to determine a % dye retention value (ret %) according to equation 1:

$$ret\ \% = 100 * \frac{[KR620]_0 - [KR620]_{CF}}{[KR620]_0} \quad (1)$$

where $[KR620]_0$ and $[KR620]_{CF}$ are the KR620 concentrations calculated for the PSL batch and the centrifugate, respectively. For the purposes of this work, a lower the concentration of KR620 in the centrifugate indicated greater retention of the dye in the PSL.

Generation of water-soluble colloidal material was not desired and the amount of Rayleigh scattering by the centrifugate was assumed to be related to the production of these unwanted materials. The absorbance at 400 nm of spectra not corrected for scattering was used to compare the extent of water soluble colloidal material synthesis in each batch.

The PIV data were recorded using either one or two Photron SA1.1 Fastcam high-speed cameras with a 1024×1024 pixel resolution and 12-bit intensity digitization. The cameras were positioned above and below the airflow and perpendicular to the laser sheet for 2D PIV. Two Sigma 105 mm f/2.8 EX DG macro lenses were used with the cameras to obtain a close-up image of the flow. The camera fields of view for all experiments were approximately 30×30 mm$^2$.

For fluorescence imaging, an Omega Optical 560 nm long pass filter was attached to the lens, blocking out all Mie scattered light from the particles and only allowing particle-emitted fluorescent light to be captured by the camera. A 527 nm dual-head Nd:YLF laser (Photonics Model DM30) was used at approximately 30 mJ/pulse to illuminate the flow and was controlled simultaneously with the camera by LaVision's DaVis software, recording at 2.5 kHz for time-resolved images. Finally, an f=−20 mm cylindrical lens was used to form a thin laser sheet at the nozzle exit. The laser sheet measured approximately 1.25 mm thick and 3.5 cm wide in the measurement plane at the nozzle exit. The cameras imaged a region of flow about 8 cm from the nozzle exit.

PSLs were generated as aqueous suspensions at approximately 9 weight % solids. Although only 3 different KR620 concentrations were utilized throughout this work, the resultant particle solution appearances varied considerably. The solution color varied from white, indicating no retention of KR620, to deep purple and various shades in between. After the PSLs were synthesized, large agglomerated polystyrene articles were observed that were strongly adhered to the stir paddle on several occasions indicating that the styrene had not been fully dispersed in the solution. In a few instances that the solution was very light in color, the polystyrene agglomerates were deeply colored indicated that the dye had preferentially segregated into the amorphous polystyrene. The solution opacity changed from empirically transparent, indicating no particle formation, to cloudy indicating either particle synthesis or emulsion formation. Once the particle solutions were stored for at least 24 h, particle formation would be apparent from separation of PSLs in the bottom of the sample bottle. An emulsion, with soluble polymeric materials, would not undergo this gravitational settling.

Several spectral properties of the PSLs were determined: fluorescent emission intensity of dried PSL samples as well as absorbance from KR620 and Rayleigh scattering at 400 nm from leach experiment solutions. The fluorescent emission was determined in the dried state to best reflect the state in which these PSLs would be used for airflow seeding in wind tunnel experiments. From leaching experiments, the dye retention (ret %) was determined by measuring the absorbance arising from KR620 in the centrifugate and using an experimentally determined molar extinction coefficient (ε=110 mM$^{-1}$cm$^{-1}$) to calculate dye concentration. Rayleigh scattering arising from soluble polymeric material was also determined in this solution by observing the absorbance at 400 nm, a wavelength where no absorbance arises from either KR620 or polystyrene. Combined, all of these characterization experiments were utilized as responses for DOE analysis.

The impact that inclusion of KR620 over the concentration range studied in this work has on the polymerization and particle synthesis was critical to understanding how incorporation of other components changed the PSL dispersion properties. As can be seen from Table 4, PSL batches PSL-1 and PSL-2, consisting of the low and high KR620 concentration limits, respectively, exhibited significantly different properties. For PSL-1, approximately 1 µparticles were generated and although the determined dye retention is high, the fluorescent emission is relatively low. The relative scattering at 400 nm, a qualitative measure of the amount of solubilized, micellar oligomeric materials, was low. PSL-2, generated with the high KR concentration, had a much lower particle size, 0.58 µm, and a much greater relative scattering value at 400 nm. Both of these results indicated that the presence of KR was disrupting the polymerization process, potentially due to the charged nature of the dye. Although the leaching study indicated that the dye was retained (87% retention), the relative fluorescent emission was very low. This indicated that the KR was not initially captured by the PSLs during synthesis and likely was retained in the agglomerated polystyrene material adhered to the stir paddle. Thus, without additional components, the pure polystyrene microspheres were determined to be unable to retain KR in a sufficient quantity to yield highly fluorescent particles while maintaining stable particle synthesis conditions.

TABLE 4

DOE Synthetic Outline for each factor

| Experiment # | Mean Particle Diameter (µm) | Relative Fluorescent Emission (a.u.) | % Ret | Relative Scattering at 400 nm (a.u.) |
|---|---|---|---|---|
| PSL-1 | 0.971 ± 0.126 | 0.012 | 97.0% | 0.053 |
| PSL-2 | 0.577 ± 0.100 | 0.016 | 87.6% | 0.201 |
| PSL-3 | 0.590 ± 0.085 | 0.073 | 23.0% | 0.798 |
| PSL-4 | 0.603 ± 0.181 | 0.432 | 12.5% | 0.166 |
| PSL-5 | 0.738 ± 0.365 | 0.008 | 100.0% | 0.262 |
| PSL-6 | 0.664 ± 0.537 | 0.005 | 92.2% | 0.454 |
| PSL-7 | — | — | — | — |
| PSL-8 | 1.357 ± 0.598 | 0.520 | 53.5% | 0.163 |
| PSL-9 | 1.574 ± 0.388 | 0.095 | 84.0% | 0.211 |
| PSL-10 | 0.654 ± 0.303 | 0.024 | 56.7% | 0.277 |
| PSL-11 | 0.772 ± 0.992 | 0.890 | 25.7% | 0.706 |
| PSL-12 | 0.577 ± 0.189 | 0.634 | 15.1% | 0.535 |
| PSL-13 | 0.695 ± 0.285 | 0.002 | 100.0% | 0.298 |
| PSL-14 | 1.593 ± 1.144 | 0.110 | 88.6% | 0.300 |

TABLE 4-continued

DOE Synthetic Outline for each factor

| Experiment # | Mean Particle Diameter (μm) | Relative Fluorescent Emission (a.u.) | % Ret | Relative Scattering at 400 nm (a.u.) |
|---|---|---|---|---|
| PSL-15 | 0.901 ± 0.828 | 0.329 | 21.9% | 0.436 |
| PSL-16 | — | — | — | — |
| PSL-17 | 0.624 ± 0.186 | 0.339 | −16.0% | 0.587 |
| PSL-18 | 0.627 ± 0.314 | 1.000 | 20.0% | 0.755 |
| PSL-19 | 0.596 ± 0.101 | 0.898 | −26.0% | 0.515 |
| PSL-20 | 0.593 ± 0.098 | 0.402 | 19.7% | 0.507 |
| PSL-21 | 0.771 ± 0.270 | 0.744 | −31.1% | 0.530 |
| PSL-22 | 0.612 ± 0.260 | 0.342 | 48.1% | 0.721 |
| PSL-23 | 0.592 ± 0.129 | 0.854 | 46.4% | 0.468 |
| PSL-24 | 0.636 ± 0.107 | 0.781 | 36.7% | 1.000 |

As the design space for these experiments was relatively small, comparison of two factors was relatively straightforward, especially considering that the combinations of greatest relevance had KR620 concentration as one of the factors. Addition of styrene sulfonate, at low KR concentrations, PSL-2, resulted in a significant reduction in particle size and an increase in relative scattering at 400 nm. Similarly, the dye retention drops off precipitously. All of these results indicate that the addition of styrene sulfonate increases the solubility of the polymeric materials. interestingly, the relative fluorescent emission increased slightly. The presence of the styrene sulfonate may have enabled better dispersion of the KR620 in the polymeric matrix once dried. At high KR620 and styrene sulfonate concentrations, PSL-4, the particle Size is approximately the same as PSL-3, batch with the same KR620 concentration and no styrene sulfonate. Although the relative fluorescent emission increased by a factor of 36, the retention was very low.

PolyD was incorporated in the dispersion for the purpose of electrostatically trapping KR620 molecules within the PSLs. Since PSLs synthesized via dispersion polymerization using potassium persulfate decomposition as a radical source have surfaces populated by sulfate groups, the polyD may preferentially interact at the particle surface. This interaction may generate an electrostatic double-layer at the PSL surface that would prevent KR620 molecules from diffusing out of the PSLs once generated. To determine whether this approach was successful or not, batches PSL-1 and PSL-5 can be compared. As can be seen in Table 4, although the particle size is reduced slightly and the standard deviation increased along with the relative scattering at 400 nm, the dye retention was retained if not improved slightly. The relative fluorescent emission was low, which would be expected at this KR620 concentration. The decreased particle size and increased standard deviation and scattering values could arise from the polyD acting to solubilize small oligomeric species similar to what was observed with incorporation of styrene sulfonate. At high KR620 and polyD concentrations, PSL-6, the particle size increased slightly as did the relative scattering at 400 nm. Although the determined % retention increased slightly, relative to PSL-2, the relative fluorescent emission actually decreased. Therefore, the addition of polyD was not enough to prevent destabilization of the dispersion polymerization arising from increased KR620 concentration.

Although it has been reported that KR emission is relatively insensitive to pH, preliminary results indicated that the fluorescent properties of KR620-doped PSLs were influenced by pH with a slightly basic pH yielding higher fluorescent emission intensity. As the pH of the PSL solution without any additional components, i.e., a dispersion generated from styrene monomer and potassium persulfate alone, was determined to be slightly acidic, a slightly basic buffer system, sodium bicarbonate, was utilized. When the buffer was included at low KR concentrations, PSL-9, the particle size increased along with the relative scattering at 400 nm, relative to PSL-1. The increased particle size correlated well with the extensive research indicating that increased ionic strength stabilizes the dispersion resulting in larger particle diameters. Although the % retention decreased (84%) relative to PSL-1, the relative fluorescent emission increased 8 times; which is significant considering the fact that the dye concentration did not change. With the inclusion of the buffer at the high KR620 concentration range, PSL-10, there was a decrease in particle size, relative to PSL-9, as well as a decrease in fluorescent emission intensity, which is surprising considering that PSL-10 was generated with an order of magnitude greater KR620 than PSL-9. The % retention also decreased, relative to PSL-9, suggesting again that the PSLs cannot retain all of the dye at this KR620 loading level.

Based on all of the dual-factor influenced identified here, there are several combinations of materials that may provide both promising PSLs and poor performing PSLs with respect to target particle size, dye retention, etc. For example, PSLs generated with both polyD and buffer may have moderate fluorescent emission properties, relatively high % retention values, and potentially low scattered light values. This combination was included in the DOE test matrix and corresponds to batches PSL-13 and PSL-14 for low and high KR620 concentrations, respectively. PSL-13 did not exhibit improved properties relative to PSL-1 (batch comprised of styrene and KR620), PSL-5 (batch comprised of styrene, KR620, and polyD), or PSL-9 (batch comprised of styrene, KR620, and buffer). PSL-14, however, exhibited properties that were superior, in most cases, to PSLs generated at this KR620 concentration without any other constituent, with just polyD, or with just the buffer; PSL-2, PSL-6, and PSL-10, respectively. Although the relative fluorescent emission was not great, it was higher than that determined for the other batches just mentioned, even though the KR620 concentration was equivalent in all cases. As described previously, this could be associated with the dye becoming associated with the large amorphous polymer residue that was found in the reaction kettle at the end of the synthesis. The results for PSL-14 suggested that the KR620 had a stronger affinity to associate with the PSLs, relative to the amorphous polymeric material. The % retention for PSL-14 was also comparable to these other batches.

As the intent of inclusion of both SS and polyD was to attempt to generate an electrostatic double layer that would act as a barrier to KR620 diffusion out of the PSLs, comparison of these batches was of interest. PSL-7 and PSL-8 are the combinations of these constituents at low and high KR620 concentrations, respectively. Inexplicably, no particles were synthesis under the conditions in PSL-7. The synthesis was repeated three times with no formation of particles. PSL-8, however, did result in particle fabrication with diameters >1 micron. Additionally, the fluorescent emission was greatest for PSL-8, relative to PSL-2 (batch consisting of just styrene and KR620), PSL-4 (batch consisting of styrene, SS, and KR620), and PSL-6 (batch consisting of styrene, polyD, and KR620). Although the % retention is somewhat lower in PSL-8, relative to PSL-2 or PSL-6, the very low fluorescent emission intensities measured for these two batches suggest that a majority of the dye had diffused into the amorphous polystyrene material retained in the reaction kettle. The relatively scattering at 400 nm was also low for PSL-8, which suggested that a less significant portion of water-soluble material was generated under these reaction conditions.

Conversely, it could be envisioned that, based on the results from dual interactions described above, the combination of SS and buffer should result in very poor performing PSLs. These combinations are represented by PSL-1 and PSL-12 for low and high KR620 concentrations, respectively. Although both batches exhibited high fluorescent emission values, both also exhibited very low % retention values. Scattering at 400 nm was high in both cases indicated a significant formation of soluble polymeric material. Similar to what has been discussed before, the mean particle diameter was smaller for PSL-12, relative to PSL-11, again suggesting that, without introduction of components to preferentially interact with the KR620, the dye disrupts the polymerization reaction resulting in smaller particles.

To examine these multi-factor influences further, statistical analysis was performed on the collective data generated in this work using the input parameters and response factors described in Tables 2 and 3, respectively. Using the goals identified in Table 3 as targets, an ideal surface was generated indicating the relative success of achieving a batch of PSLs that possessed these properties. For example, if the target mean particle diameter was 1 μm, but using the constraints of the input parameters and interpolating results from the response factors yields a solution whereby a particle diameter of 0.75 μm would be achieved in order to balance results for other response factors, the success criteria would be less than 100%.

Polystyrene Microsphere Synthesis and Characterization-Large Scale Experiments.

The ultimate goal was to identify reaction conditions necessary, or most likely, to yield highly fluorescent particles that were approximately 1 μm in diameter and exhibited nominal leaching of the dye into the suspension solution, water (Table 2). These conditions, once determined, were utilized to synthesize a large batch (approximately 2 L at 9 wt % solids) of KR620-doped PSLs for use in air flow seeding experiments, described below. The synthetic procedure for generation of PSLs of controlled diameter on this scale included obtaining a large reaction kettle, fitted inside a heating mantle, that was outfitted with a thermocouple, mechanical stir paddle, a water-cooled condenser, and a sparging tube. The kettle was charged with approximately 2 L of deionized water (250 mL, 18 MΩ), freshly distilled styrene (187 g), sodium bicarbonate (12 g), polyD (0.8 g), KR620 (0.4 g), and styrene sulfonate (20 g). This solution was heated to 70° C. and sparged with $N_2$ (400 scfm) for 45 min while being stirred at 150 RMP. Approximately 30 mL of deionized water was placed in a beaker which was heated to approximately 70° C. After sparging, the sparging tube was replaced with a cold finger and the $N_2$ flow was diverted through the thermocouple adapter at the same flow rate to maintain an inert atmosphere over the reaction solution. The stir rate was increased to 250 RPM, 1.6 g $K_2S_2O_8$ was added to the 30 mL of heated water which was subsequently added to the reaction kettle. The reaction was stirred for 21 hours, cooled to ambient temperature, and poured through cheesecloth to remove large agglomerated polystyrene materials.

Based on the predicted resulted and calculated necessary synthetic ingredients from the DOE analysis, a 2 L batch of PSLs, at 9 weight % particles, was synthesized. Although the resultant mean particle diameter was determined to be 0.868-0.305 μm, the particle size distribution appeared to be bimodal with one distribution of PSLs centered around 0.6 μm and another distribution centered around 1.1 μm. As there is a significant mass difference in these two particle distributions, a majority of the particle mass was represented by the larger diameter distribution. As the airflow visualization experiments will be insensitive to a majority of the PSLs in the smaller diameter distribution, the standard deviation of the detected particle size was significantly lower than 0.305 μm.

The flow and PIV instrumentation discussed above were used for comparison of Mie scattering and fluorescence imaging of the particles. The KR620-doped PSL particles were seeded using two Air-o-Swiss 7146 ultrasonic humidifiers. Seed was introduced well upstream of the nozzle exit into the blower inlet, where it mixed with the air at room temperature and flowed through a nozzle of 6 cm exit diameter. Before each test, the KR620 particle solution was mixed in equal proportions with distilled water and sonicated for fifteen minutes in an L&R Quantrex 90H ultrasonic disruptor to prevent particle agglomeration. The mixture was then removed from the disruptor and placed immediately into the vaporizer. The two camera setup was used to image Mie scattered and fluorescent light simultaneously. The second camera was placed on a 3-axis traverse and 3-axis camera mount so that it could be maneuvered to image the same particles in the flow.

Additional tests were run with a single camera; the setup remained the same, except for the removal of the second camera. In these tests, the near-surface flow over a blunt leading edge flat aluminum plate was measured. In the first test, the plate was oriented parallel to the flow exiting the nozzle and perpendicular to the incident laser sheet. In the second test, the plate was oriented 45° to the incident laser sheet but still parallel to the airflow. For these single-camera tests, a set of 2000 double-frame fluorescent images was obtained with the filter over the lens. Then, the filter was quickly removed and another 2000 double-frame images were recorded of the Mie-scattered signal.

For these tests, the lens aperture for the fluorescent camera was set at f/, while the aperture for the Mie camera was set at f/22 due to the brighter signal. There was considerable laser flare in the Mie-scattering image near the plate surface. Additionally, reflections from other objects in the test section appeared in the free stream flow, which drastically reduced the signal to noise ratio (SNR) of the images and impeded particle tracking. The use of fluorescent particles with an optical filter completely eliminated this laser flare. The plate surface was visible in the fluorescent images due to a combination of Raman scattering off of the aluminum and particles attached to the surface. However, this signal was low and did not leak onto neighboring pixels away from the plate surface, and therefore did not decrease the SNR of the particles in the flow.

When the images were processed to obtain velocity vectors, the differences were clear. The detrimental effects of reflections and laser flare were clearly seen in the Mie images, both in the free stream and near the surface of the plate, where the velocities were erroneously calculated as being greater than the velocities actually were (the velocities are expected to approach zero at the wall). The fluorescent data did not show such effects and gave an accurate measurement of the flow in the free stream and near the surface.

Additionally, these tests demonstrated successful fluorescence imaging and PIV processing of the KR620 PSL particles in an airflow over 30 m/s. Previous dye-doped PSL particles have not been able to support fluorescent PIV in airflows over 30 m/s. The tests demonstrated that dye-doped PSL particles according to the various embodiments, such as the KR620 PSL particles tested, enable successful fluorescence imaging and PIV processing in an airflow over 30 m/s, a first for dye-doped PSL particles and fluorescent PIV.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

All cited patents, patent applications, and other references are incorporated herein by reference in their entirety. However, if a term in the present application contradicts or conflicts with a term in the incorporated reference, the term from the present application takes precedence over the conflicting term from the incorporated reference. All ranges disclosed herein are inclusive of the endpoints, and the endpoints are independently combinable with each other. Each range disclosed herein constitutes a disclosure of any point or sub-range lying within the disclosed range.

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A method of making a dye-doped polystyrene microsphere, comprising:
    providing a first amount of a styrene monomer;
    providing a second amount of a radical initiator;
    providing a third amount of a fluorescent dye;
    providing a fourth amount of a functionalized monomer selected to impart a charge on the styrene monomer;
    providing a fifth amount of a polyelectrolyte material of opposite charge to the functionalized monomer; and
    reacting the first amount of a styrene monomer, the second amount of a radical initiator, the third amount of a fluorescent dye, the fourth amount of a functionalized monomer, and the fifth amount of a polyelectrolyte material together in an inert atmosphere to generate the dye-doped polystyrene microsphere having a mean diameter from about 0.5 µm to about 1.5 µm.

2. The method of claim 1, further comprising providing a sixth amount of a buffer material, wherein reacting the first amount of a styrene monomer, the second amount of a radical initiator, the third amount of a fluorescent dye, the fourth amount of a functionalized monomer, and the fifth amount of a polyelectrolyte, material together in an inert atmosphere to generate the dye-doped polystyrene microsphere comprises reacting the first amount of a styrene monomer, the second amount of a radical initiator, the third amount of a fluorescent dye, the fourth amount of a functionalized monomer, the fifth amount of a polyelectrolyte material, and the sixth amount of the buffer material together in an inert atmosphere to generate the dye-doped polystyrene microsphere.

3. The method of claim 2, wherein the radical initiator is potassium persulfate.

4. The method of claim 3, wherein the fluorescent dye has a positive charge or a negative charge.

5. The method of claim 4, wherein the fluorescent dye is kiton red 620 (KR620).

6. The method of claim 2, wherein the functionalized monomer is a functionalized styrene monomer or a functionalized acrylate monomer.

7. The method of claim 6, wherein the functionalized monomer is sodium styrene sulfonate.

8. The method of claim. 2, wherein the polyelectrolyte material is poly(diallyldimethyl ammonium chloride) (polyD).

9. The method of claim 2, wherein the buffer material is sodium bicarbonate.

10. The method of claim 9, wherein:
    the radical initiator is potassium persulfate;
    the fluorescent dye is kiton red 620 (KR620);
    the functionalized monomer is sodium styrene sulfonate;
    the polyelectrolyte material is poly(diallyldimethyl ammonium chloride) (polyD);
    the first amount of the styrene monomer is 33 mL;
    the third amount of the KR620 is 5 milligrams to 50 milligrams; and
    the second amount of the potassium persulfate is 0,2059 grams.

11. The method of claim 9, wherein:
    the radical initiator is potassium persulfate;
    the fluorescent dye is kiton red 620 (KR620);
    the functionalized monomer is sodium styrene sulfonate;
    the polyelectrolyte material is poly (diallyldimethyl ammonium chloride) (polyD);
    the first amount of the styrene monomer is 187 grams;
    the fourth amount of the sodium styrene sulfonate is 20 grams;
    the fifth amount of the polyD is 0.8 grams;
    the sixth amount of the sodium bicarbonate is 12 grams;
    the third amount of the KR620 is 0.4 grams; and
    the second amount of the potassium persulfate is 1.6 grams.

12. The method of claim 9, further comprising providing a seventh amount of a cross linking agent, wherein reacting the first amount of a styrene monomer, the second amount of a potassium persulfate, the third amount of a xanthene dye, the fourth amount of a functionalized monomer, the fifth amount of a polyelectrolyte material, and the sixth amount of the buffer material together in an inert atmosphere to generate the dye-doped polystyrene microsphere comprises reacting the first amount of a styrene monomer, the second amount of a potassium persulfate, the third amount of a xanthene dye, the fourth amount of a functionalized monomer, the fifth amount of a polyelectrolyte material, the sixth amount of the buffer material, and the seventh amount of the cross linking agent together in an inert atmosphere to generate the dye-doped polystyrene microsphere.

13. The method of claim 12, wherein the cross linking agent is divinylbenzene.

14. The method of claim 1, where the dye-doped polystyrene microsphere has a mean diameter of about 1 μm.

* * * * *